(12) United States Patent (10) Patent No.: US 8,374,809 B2
DeLeo et al. (45) Date of Patent: Feb. 12, 2013

(54) SYSTEMS FOR MONITORING DATA FROM POINTS ALONG VOLTAGE TRANSMISSION LINES

(75) Inventors: David DeLeo, Sayreville, NJ (US); Franklin Miller, Union, NJ (US)

(73) Assignee: Electronic Technology, Inc., Irvington, NJ (US)

( * ) Notice: Subject to any disclaimer, the term of this patent is extended or adjusted under 35 U.S.C. 154(b) by 412 days.

(21) Appl. No.: 12/394,622

(22) Filed: Feb. 27, 2009

(65) Prior Publication Data

US 2010/0223018 A1 Sep. 2, 2010

(51) Int. Cl.
*G01R 19/155* (2006.01)
(52) U.S. Cl. .......................................... 702/64; 340/660
(58) Field of Classification Search .............. 702/57–62, 702/64, 182–185; 375/224–228; 370/252, 370/408, 409; 340/538, 660, 662; 315/294, 315/318; 324/87, 521, 522, 539–544
See application file for complete search history.

(56) References Cited

U.S. PATENT DOCUMENTS

2002/0105231 A1* 8/2002 Koeppe et al. .................. 307/64
2009/0212965 A1* 8/2009 Becattini et al. .............. 340/660

* cited by examiner

*Primary Examiner* — Sujoy Kundu
(74) *Attorney, Agent, or Firm* — Stroock & Stroock & Lavan LLP (57) ABSTRACT

A transceiver module for monitoring a voltage distribution network that includes a voltage carrying power line and a transmitter along the voltage carrying power line for transmitting a first monitoring signal that includes information related to the condition of the voltage distribution network. The transceiver module comprises a receiver located along the voltage carrying power line at a distance from the transmitter, the receiver configured to receive the first monitoring signal; a sensor that monitors a condition of the voltage distribution network and produces a sensor signal that contains information related to the condition being monitored; and a monitor in communication with the receiver and the sensor thereby receiving the first monitoring signal and the sensor signal, the monitor configured to provide a second monitoring signal that includes the information contained in the first monitoring signal and the sensor signal.

19 Claims, 5 Drawing Sheets

SYSTEMS FOR MONITORING DATA FROM POINTS ALONG VOLTAGE TRANSMISSION LINES

FIELD OF THE INVENTION

The present invention is directed to the field of monitoring power distributing networks.

BACKGROUND OF THE INVENTION

In the field of electric utilities there is a need to monitor the status of various aspects of an electrical distribution grid in order to avoid power outages, overloads, and other costly fault conditions. Heretofore, one way this has been accomplished is through the use of a monitoring system having distributed transmitters located on various network distribution feeders.

Typically, in such a monitoring system a transmitter and sensors are installed at different positions along a voltage carrying power line to be monitored. A receiver is placed at the network substation (it should be noted that references to a voltage carrying power line refer to cables used for voltage, without mandating that the cables actually carry voltage at all times). The transmitter periodically transmits data, received from the sensors, to the receiver at the substation, through the voltage carrying power line. At the substation, a receiver detects the signal sent by the transmitter through the voltage carrying power line. The receiver, which may be part of a computer system that includes a microprocessor, decodes the signal data and stores the data. A computer system comprising the receiver may also be used to perform various types of signal data processing to obtain a variety of monitoring functions.

These monitoring systems, while effective, often have several limitations that result from the signals being transmitted via the voltage carrying power line. For example, the distributed transmitters, generally, blindly transmit their signals through the voltage carrying power line, and as a result frequently interfere with one another, thereby preventing their reception. Furthermore, transmissions via a voltage carrying power line can be disrupted by interruptions in the voltage carrying power line itself (for example from the opening of a breaker at a substation). An embodiment of the present invention seeks to remedy these limitations by providing a transceiver module to detect reception and the transmission of data to and from various points along an electrical distribution grid.

SUMMARY OF THE INVENTION

In view of the above discussion and the shortcomings in the field of voltage distribution monitoring systems, the device and system for monitoring voltage distribution networks discussed below seeks to overcome such shortcomings. In one embodiment there is disclosed a transceiver module for monitoring a voltage distribution network that includes a voltage carrying power line and a transmitter along the voltage carrying power line for transmitting a first monitoring signal that includes information related to the condition of the voltage distribution network. The disclosed transceiver module comprises a receiver located along the voltage carrying power line at a distance from the transmitter (note that in the certain embodiments the transmitter is also a transceiver module), the receiver configured to receive the first monitoring signal. The disclosed transceiver module further comprises a sensor (or series of sensors) that monitors a condition(s) of the voltage distribution network and produces a sensor signal that contains information related to the condition being monitored. Additionally, the disclosed transceiver module comprises a monitor in communication with the receiver and the sensor thereby receiving the first monitoring signal and the sensor signal. The monitor provides a second monitoring signal that includes the information contained in the first monitoring signal and the sensor signal.

In another embodiment, there is disclosed a voltage distribution network monitoring system for monitoring a voltage distribution network that includes at least one voltage carrying power line. The disclosed monitoring system comprises at least one transmitter located along the voltage carrying power line. The transmitter of the disclosed monitoring system includes at least one sensor that monitors a condition of the voltage distribution network and produces a sensor signal that contains information related to the condition being monitored. The transmitter is also configured to provide a first monitoring signal that includes the information related to the condition being monitored. In addition to the transmitter, the disclosed monitoring system includes a transceiver module for receiving the first monitoring signal and providing a second monitoring signal. The transceiver module of the disclosed monitoring system comprises a receiver located along the voltage carrying power line at a distance from the transmitter (note that in the certain embodiments the transmitter is also a transceiver module), the receiver configured to receive the first monitoring signal. The transceiver module further comprises a sensor (or series of sensors) that monitors a condition(s) of the voltage distribution network and produces a sensor signal that contains information related to the condition being monitored. Additionally, the transceiver module comprises a monitor in communication with the receiver and the sensor thereby receiving the first monitoring signal and the sensor signal. The monitor provides a second monitoring signal that includes the information contained in the first monitoring signal and the sensor signal.

DETAILED DESCRIPTION OF THE INVENTION

Certain embodiments of the present invention will be discussed with reference to the aforementioned figures, wherein like referenced numerals will refer to like components. It should be noted that references in the specification to phrases such as "one embodiment" or "an embodiment" means that a particular feature, structure or characteristic described in connection with the embodiment is included in at least one embodiment of the invention. The phrases such as "in one embodiment" or "in certain embodiments" in various places in the specification are not necessarily, but can be, referring to the same embodiment.

Figure 1:
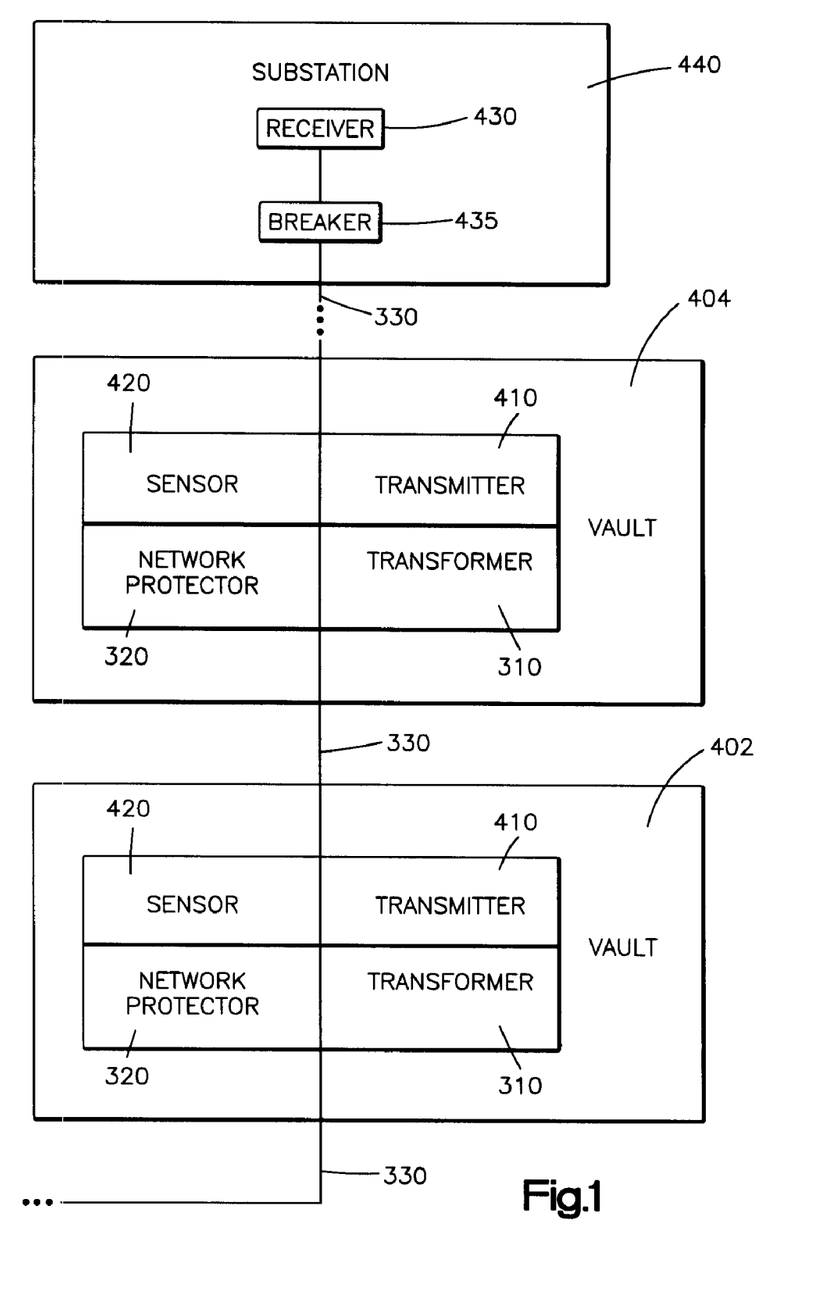
FIG. 1 is a fragmentary diagram of a conventional voltage distribution system.

By way of background, as illustrated in FIG. 1, in a typical voltage distribution system, voltage is distributed through a network of voltage carrying power lines 330 that connect multiple underground vaults such as vaults 402, 404. These vaults 402, 404 contain transformers 310 for stepping down voltage for distribution to buildings, and network protectors 320 for disconnecting transformers 310 from the network (for example, when breakers connecting voltage carrying power lines 330 to the network substation 440 are taken out of service by an opening of breaker 435). Additionally the vaults 402, 404 contain sensors 420 that sense various aspects of the voltage distribution system, such as, conditions of the network protector (described in further detail below) and produce sensor signals containing this information. The vaults 402, 404 further contain signal transmitters 410 that are connected to the voltage carrying power line 330 and the respective sensors 420 and send sensor signals through the voltage carrying power line 330. The signals sent by the signal transmitters 410 are received at a receiver station 430, located at a power substation 440, where they are interpreted and monitored.

The signal transmitters 410 transmit an information signal related to certain condition, such as the network voltage, load, position of the switch at the network protector 320, and temperature, pressure and level of oil of the transformer, independent of any other transmitters 410 that are also transmitting through the voltage carrying power line 330. Because the transmitters 410 transmit independently of one another, interference between signals that are sent simultaneously by transmitters 410 in vault 402 and those in vault 404 frequently occur. A further problem arises if voltage carrying power line 330 is disconnected from a receiver 430 due to an opening of a breaker 435 at the substation 440 (for example, due to an overload or for maintenance).

In one exemplary embodiment of the present invention, a transceiver module 1 receives monitoring signals containing information related to the status of the voltage distribution network which monitoring signals are transmitted along the voltage carrying power line by transmitters located on the voltage carrying power line 330; monitors a condition of the voltage distribution network such as a network protector 320; and transmits a monitoring signal containing the monitoring information it receives together with the monitoring information it senses through a voltage carrying power line 330 and/or an external network 80. In accordance with this invention, the transceiver module 1 may also receive and perform actions based upon monitoring signals that contain commands which may be sent from a command station or other signals related to voltage distribution networks. In certain embodiments, the transceiver module 1 may receive the monitoring signals through an external network 80. It should be noted that while monitoring signals preferably contain information relating to a detectable aspect of the voltage distribution system, the monitoring signals may contain any other relevant information such as, for example, time of sending, model of the transceiver module, etc.

To facilitate its functionality, transceiver module 1 includes or is connected to a pick-up coil 10, which acts as a receiver for receiving signals being transmitted through a voltage carrying power line 330, and a monitor 100, which processes signals received via pick-up coil 10 and transmits those signals and/or additional signals through the voltage carrying power line 330. The monitor 100 may include components allowing it to be configured to transmit through a connection to an external network 80 where such network may be, for example, the internet, POTS network, RF radio link, fiber optic, and/or commercial cellular (the terms connection to an external network and external network are used interchangeably in this application).

The pick-up coil 10, which is not hard-wired to the voltage carrying power line 330, picks up signals from the voltage carrying power line 330. A preferred pick-up coil 10 may be a pick-up antenna disclosed in a co-pending application Ser. No. 12/394,779, filed Feb. 27, 2009 and assigned to the same assignee as this patent which is incorporated herein by reference as if fully set forth herein. In addition to pick-up coil 10 (or instead of pick-up coil 10), a hard-wired connection to the voltage carrying power line 330, or any other module capable of receiving signals being transmitted through a voltage carrying power line 330, may be used.

Figure 2:
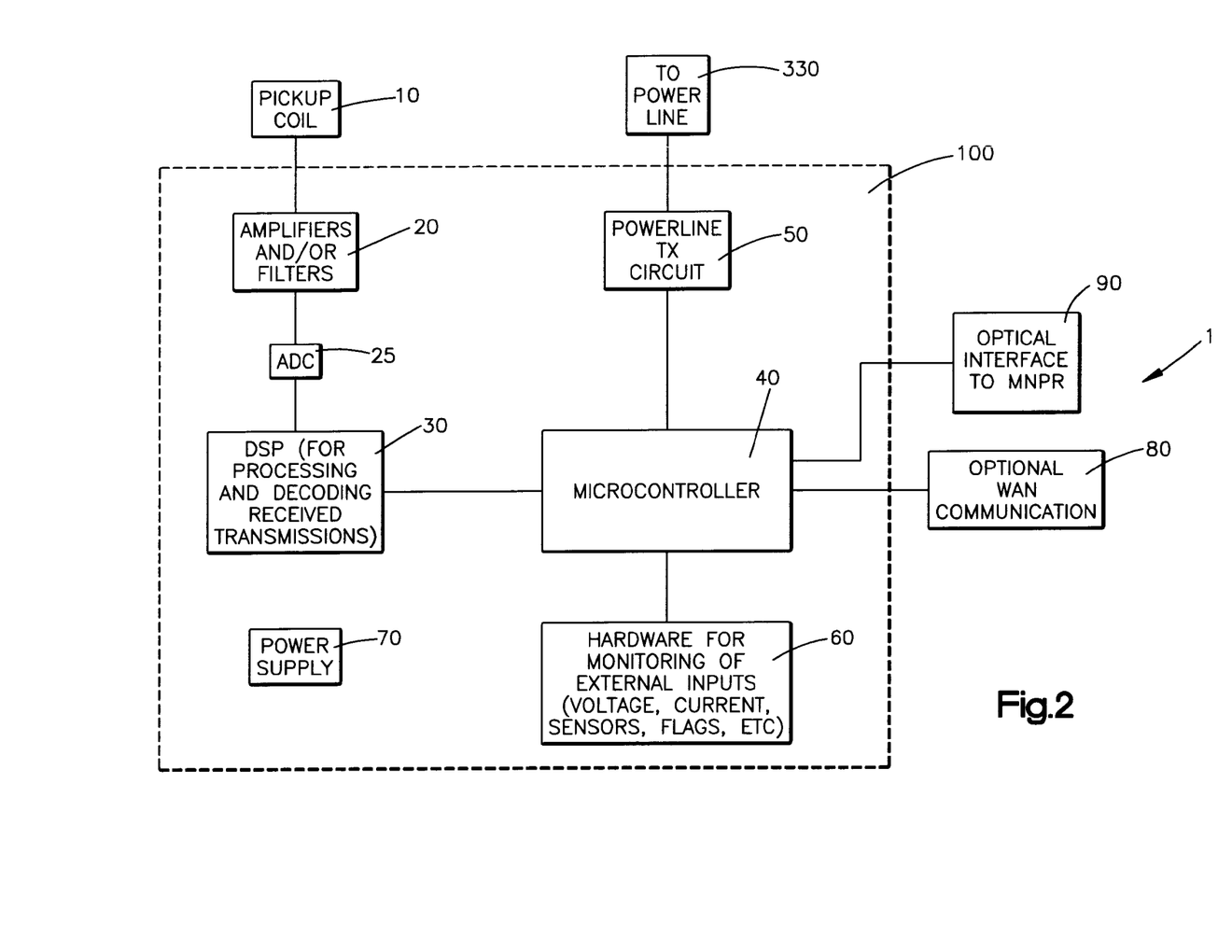
FIG. 2 is a diagram of an exemplary embodiment of the present invention.

In the exemplary embodiment shown in FIG. 2, the monitor 100 includes include amplifiers and/or filters 20; analog to digital converter 25, digital signal processor 30; a microcontroller 40; power line transfer circuit 50; hardware for monitoring of external inputs 60; power supply 70; a connection to an external network 80; and a connection to a relay 90, which may, in some embodiments, be a connection through an optical interface such as infrared (although any other suitable connection may be utilized). In use, the amplifiers and/or filters 20 of the monitor 100 condition a signal that the monitor 100 receives from the pick-up coil 10. The conditioned signal is passed to an analog to digital converter 25 that converts the conditioned signal and presents it to the digital signal processor 30 in digital form. Digital signal processor 30 detects and demodulates the signal before passing the decoded data to the microcontroller 40 for further interpretation. Microcontroller 40, in addition to receiving signals from digital signal processor 30, is configured to send and receive signals to and from hardware for monitoring of external inputs 60, which inputs may be from sensors 420 and which are preferably related to the status of a network protector 320, transformer 310, or the voltage distribution network. Microcontroller 40 is also configured to receive signals from and send signals to a relay 200 via a connection 90. Microcontroller 40 contains programming thereon to analyze and process the signals it receives. Furthermore, microcontroller 40 can transmit the signals it receives, the signals it may derive from the signals it receives, as well as signals it creates either via a power line transfer circuit 50 through a voltage carrying power line 330, or through an external network 80, or through both. Moreover, microcontroller 40 can control the relay 200 and thereby the network protector 320, by sending signals through the connection to the relay 90. The functioning of the monitor 100 is powered by a power supply 70.

Amplifiers and/or filters 20 may be any type of amplifier or filter that can be, for example, variable gain amplifiers, operational amplifiers, IC's, or any type of filter or amplifier that is useful in boosting and/or removing noise from a signal received by a pick-up coil 10 from a voltage carrying power line 330. Amplifiers or filters 20 are preferably configured with an appropriate gain for each level of signal being monitored. In an embodiment of the invention, the amplifier and/or filters 20 consist of a variable gain amplifier and several operational amplifiers which perform automatic gain control and some rough filtering. Further filtering by the amplifiers and/or filters 20 can be performed by a chain of tunable filter IC's which comb out the 4 frequencies of interest, for example 45, 50, 55, and 62 kHz.

Analog to digital converter 25 may be a single channel converter or any other suitable type capable of converting the signal that may be filtered and amplified by amplifiers and/or filters 20 and presenting the signal to digital signal processor 30 in digital form. Digital signal processor 30 may be any signal processor capable of detecting and demodulating the digital signal before passing the decoded data to the microcontroller 40 for further interpretation.

Microcontroller 40 may be any processor that is capable of interpreting digital signals, such as the signal received from the digital signal processor 30, performing operations thereon, executing commands, and other functions native to a microprocessor. In some embodiments microcontroller 40 and digital signal processor 30 may be the same processor.

Power line transfer circuit 50 may be any suitable circuit that is electrically coupled to a voltage carrying power line 330, and configured to transmit signals thereto. Alternatively, it may any other conduit for transferring signals from the monitor 100 to the voltage carrying power line 330.

Figure 3:
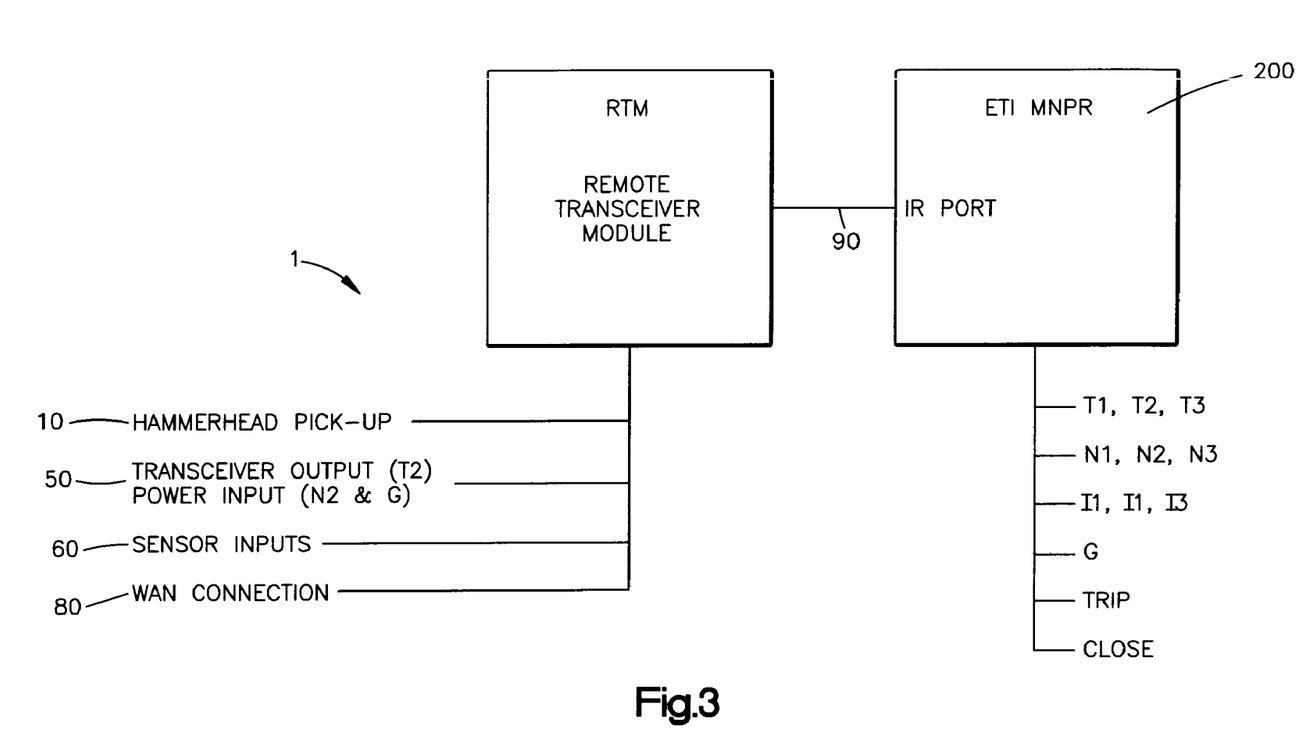
FIG. 3 is a diagram of an exemplary embodiment of the present invention, connected to an embodiment of a network protector.

Hardware for monitoring inputs 60, as shown in FIG. 3, may be connected to sensors 420 that may be located anywhere, and which may detect various aspects of the status of the network protector 320 such as the network voltage, load, position of the switch at the network protector, and temperature, pressure and level of oil of the network transformer 310. Additionally monitor 100 can contain a connection 90, which may be a connection via an infrared port, to a relay 200, which monitors and controls a network protector 320 that is connected to the transformer 310. The relay 200 may be a MNPR®, which is manufactured by Electronic Technology Inc., or any other relay.

In various embodiments, not every module may be included, and a single module may be configured to incorporate the functionality of other modules so long as the ability to receive monitoring signals transmitted through a voltage carrying power line and to transmit additional monitoring signals that contain the information of the monitoring signals received and additional information is retained. It should be noted that references to connections to sensors 420 could means a direct connection or a connection through a conduit or another module that passes the information contained in a signal generated by the sensor or even the signal itself.

Figure 4A:
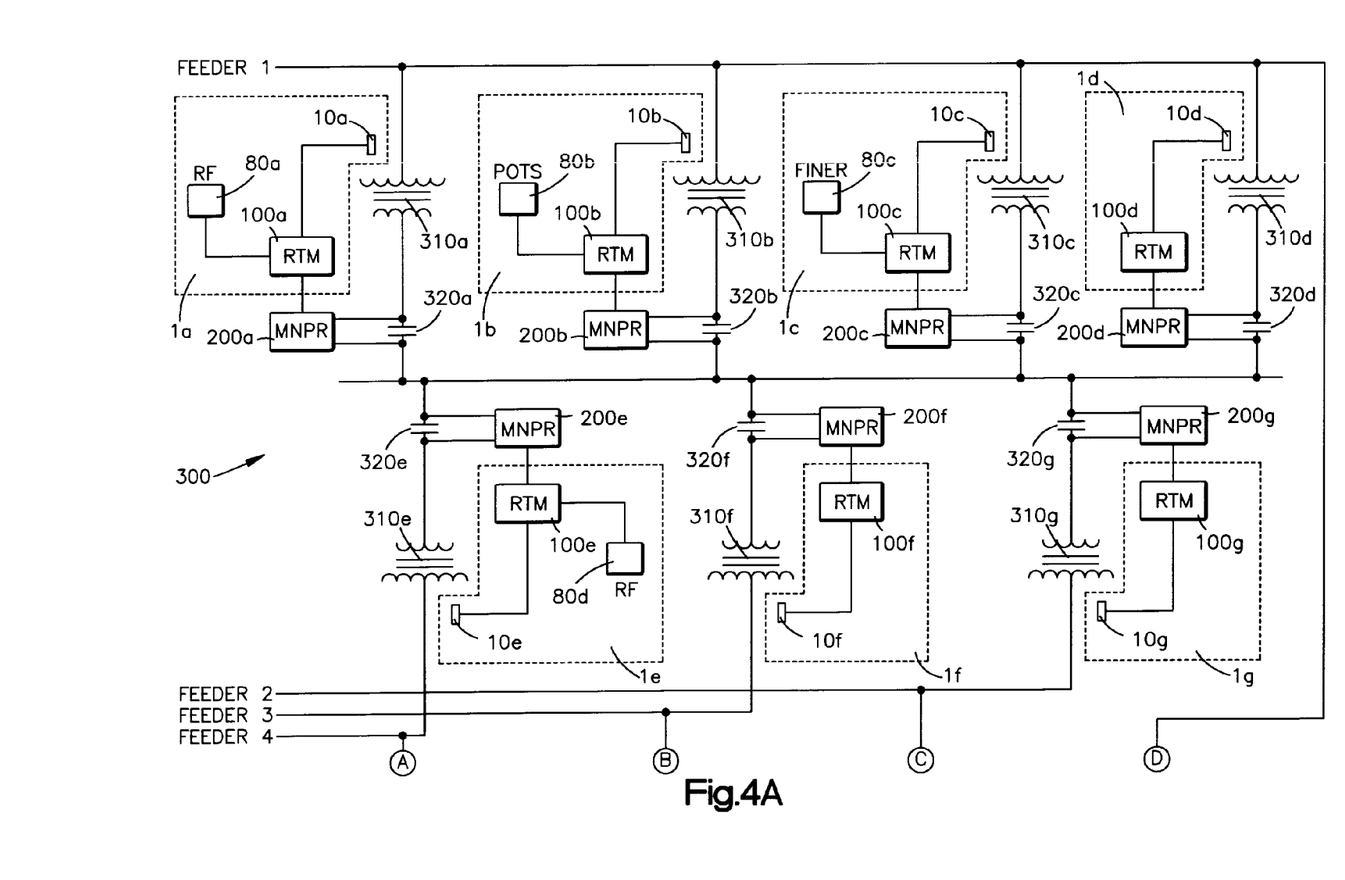
FIG. 4A is a section of an exemplary voltage distribution network monitoring system that includes various embodiments of the present invention.
Figure 4B:
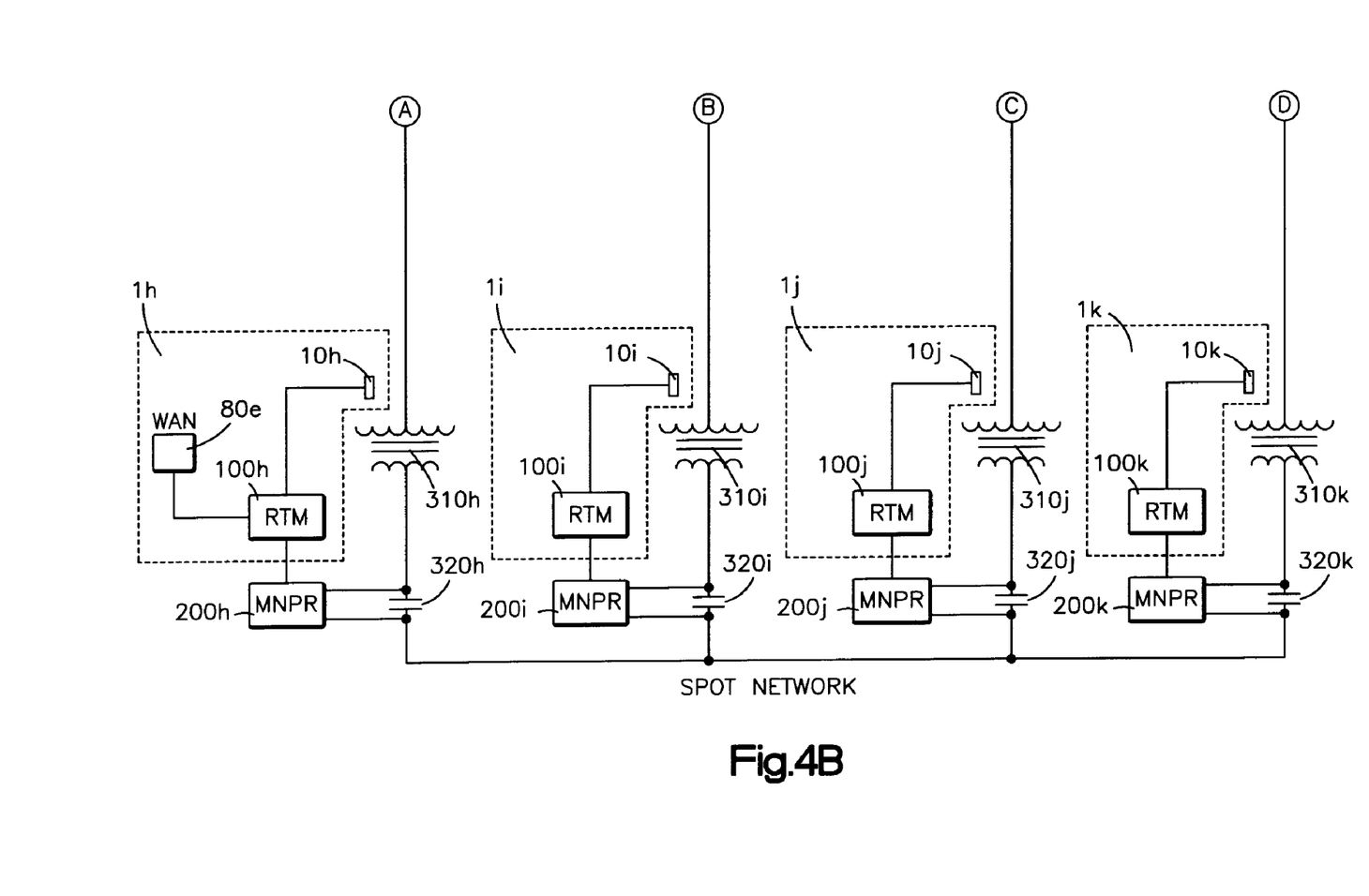
FIG. 4B is a section of an exemplary voltage distribution network monitoring system that includes various embodiments of the present invention.

As shown in an embodiment illustrated in FIG. 4, transceiver modules $1a$ through $1k$ can be utilized to create an improved voltage distribution network monitoring system 300. FIG. 4 shows multiple embodiments of transceiver modules 1(as illustrated in detail in FIG. 2, and delineated by dashed lines). Each transceiver module $1a$ through $1k$, is mounted at various network protectors $320a$ through $320k$, and is configured to transmit, on a periodic basis or otherwise, monitoring signals carrying information such as such as the network voltage, load, position of the switch at the relevant network protector $320a$ through $320k$, and temperature, pressure and level of oil of the relevant network transformer $310a$ through $310k$, or any other relevant information. The signals transmitted by monitors $100a$ through $100k$ of transceiver modules $1a$ through $1k$ are derived from sensor signals of various sensors 420, by the hardware for monitoring external inputs 60 of each transceiver module $1a$ through $1k$Additionally, each transceiver module $1a$ through $1k$ picks up, via its pick-up coil $10a$ through $10k$, monitoring information sent by other transceiver modules $1a$ through $1k$ or other modules (not shown) that are located along the same voltage carrying power line $330a$ through $330d$. Thus, transceiver modules $1a$ through $1k$ are preferably configured such that each monitoring signal sent contains a collection of all information that has been transmitted along the relevant voltage carrying power line $330a$ through $330d$. Furthermore, throughput of monitoring system 300 is improved by configuring each transceiver module $1a$ through $1k$ to minimize the interference caused by simultaneous transmissions over voltage carrying power line $330a$ through $330d$ by using the pick-up coil $10a$ through $10k$ to check whether any other module is transmitting over the relevant voltage carrying power line $330a$ through $330d$, and transmitting a signal only if a channel is clear.

Where a disruption in the voltage carrying power line 330 (for example due to a breaker 435 being opened at a substation) would preclude signals sent by a transmitter from being received by a substation receiver 430, monitoring system 300 retains full, or close to full, monitoring functionality in spite of such disruptions. For example, if the voltage carrying power line $330a$, along which a transceiver module $1a$ through $1d$ are located, is disrupted, transceiver module $1a$ can send the signal via a connection to an external network $80a$ to a receiver (which may be a computer system connected to an external network, a server to which users can connect over the internet, or another type of computer system that includes the receiver or is connected to a receiver) or to transceiver module $1e$, which is located along a non-disrupted voltage carrying power line $330d$. The signals sent by the transceiver module $1a$ preferably contains both the monitoring information from the sensors 420 to which transceiver module $1a$ is connected through hardware 60, as well as the information from the monitoring signals sent by the transceiver modules $1b$ through $1d$, which are positioned along the same voltage carrying power line $330a$. In various embodiments of the monitoring system 300, various numbers of transceiver modules 1 may be configured with connections to external networks $80a$ through $80e$, and more than one external network may be utilized within the same monitoring system 300.

In use, monitoring system 300 is also utilized to avoid malfunctions in the voltage distribution network. For example, if the signal sent by one of the transceiver modules $1h$ contains information indicating that a transformer $310h$ is not functioning properly, an operator of a computer system that includes the receiver that receives this information may respond (although each transceiver module $1a$ through $1k$ can be configured to perform an action automatically). The operator has the option to issue a command to the relay $200h$ to open the switch on network protector $320h$. If the operator issues such a command signal using the computer system that includes receiver, the command signal may be sent via a voltage carrying power line $330d$, or an external network $80e$, to the transceiver module $1h$ that is in communication with the relay $200h$. This transceiver module $1h$, upon receiving the command signal, either through the voltage carrying power line $330c$ via pick-up coil $10c$, or through an external network $80e$, then signals the relay $200h$ to open the switch on the network protector $320h$ thereby disconnecting the malfunctioning transformer $310h$ from the network. This monitoring can be accomplished even if the voltage carrying power line is disrupted by the opening of the breaker 435 at substation 440 because the monitoring system 300 can continue at full (or near full) monitoring capacity by having the transceiver module $1h$ transmit and receive signals through an external network $80h$ as described above. As shown in FIG. 4, an array or arrays of various embodiments of transceiver module $1a$ through $1k$ could be utilized so that signals may be received at any one of the transceiver module $1a$ through $1k$ locations, and so that each transceiver module $1a$ through $1k$ can convey signals of all (or some) of the transceiver modules $1a$ through $1k$ that were located on the voltage carrying power line $330a$ through $330d$ through the voltage carrying power line $330a$ through $330d$ or through an external network $80a$ through $80e$.

In a further embodiment, it is envisioned that transceiver modules 1 can be combined with various modules, hardware, microprocessors and software to create an automated monitoring and control system where transceiver modules 1 are used to relay information signals and command signals (either issued via some preset program or manually by an operator) between various points along the electrical distribution grid (either through the voltage carrying power line 330 or external network 80) to effectively manage the entire power network by performing actions such as switching of network protectors. In various embodiments the transceiver modules 1 may be configured to send selected information signals in signals in response to command signals requests (for example, a first transceiver module 1 may receive a command signal to transmit information related to the status of a network protector connected to a second transceiver module 1). Such systems would not be possible with conventional devices because of their limits due to the conventional monitoring systems' inability to retrieve information if a powerline is interrupted and their uni-directional capability.

It will be appreciated by those skilled in the art that the figures are purely illustrative, and that the device may be implemented in any number of ways, as long as the functionality is retained.

What is claimed is:

1. A transceiver module for monitoring a voltage distribution network that includes a voltage carrying power line and a transmitter along the voltage carrying power line for transmitting a first monitoring signal that includes information related to the condition of the voltage distribution network, the transceiver module comprising:
    a pick-up antenna located along the voltage carrying power line at a distance from the transmitter, the pick-up antenna configured to receive the first monitoring signal, wherein the pick-up antenna is not hard-wired to the voltage carrying power line;
    a sensor that monitors a condition of the voltage distribution network and produces a sensor signal that contains information related to the condition being monitored; and
    a monitor in communication with the pick-up antenna and the sensor thereby receiving the first monitoring signal and the sensor signal, the monitor configured to provide a second monitoring signal that includes the information contained in the first monitoring signal and the sensor signal.

2. The transceiver module of claim 1, wherein the monitor is configured to provide the second monitoring signal by transmitting the second monitoring signal through the voltage carrying power line.

3. The transceiver module of claim 1, wherein the monitor is further configured to determine whether the voltage carrying power line is available for transmission at a point in time by determining whether the pick-up antenna is receiving a first monitoring signal at the point in time.

4. The transceiver module of claim 1, wherein the voltage distribution network includes an external network, wherein the monitor is in communication with the external network and wherein the monitor is configured to provide the second monitoring signal by transmitting the second monitoring signal through the external network.

5. A transceiver module for monitoring a voltage distribution network that includes a voltage carrying power line, a network protector for protecting at least a transformer of the voltage distribution network, and a transmitter along the voltage carrying power line for transmitting a first monitoring signal that includes information related to the condition of the voltage distribution network, the transceiver module comprising:
    a receiver located along the voltage carrying power line at a distance from the transmitter, the receiver configured to receive the first monitoring signal;
    a sensor that monitors a condition of the voltage distribution network and produces a sensor signal that contains information related to the condition being monitored; and
    a monitor in communication with the receiver, network protector and the sensor thereby receiving the first monitoring signal and the sensor signal, the monitor configured to provide a second monitoring signal that includes the information contained in the first monitoring signal and the sensor signal;
    wherein the transceiver module is located proximate to the network protector and the monitor is further configured to determine a condition based upon the information contained in at least one of the first monitoring signal and the sensor signal, and to control the network protector to selectively disconnect the at least a transformer from the voltage distribution network based upon the condition.

6. The transceiver module of claim 1, wherein the voltage distribution network includes an external network and a computer system that is connected to the external network and provides a command signal through the external network, wherein the monitor is in communication with the external network and wherein the monitor receives the command signal and performs an operation based upon the command signal.

7. A voltage distribution network monitoring system for monitoring a voltage distribution network that includes at least one voltage carrying power line, the monitoring system comprising:
    at least one transmitter located along the voltage carrying power line including at least one sensor that monitors a condition of the voltage distribution network and produces a sensor signal that contains information related to the condition being monitored, wherein the transmitter provides a first monitoring signal that includes the information related to the condition being monitored; and
    a transceiver module for receiving the first monitoring signal and providing a second monitoring signal, the transceiver module comprising:
        a pick-up antenna located along the voltage carrying power line at a distance from the transmitter, the pick-up antenna configured to receive the first monitoring signal, wherein the pick-up antenna is not hard-wired to the voltage carrying power line;
        a sensor that monitors a condition of the voltage distribution network and produces a sensor signal that contains information related to the condition being monitored; and
        a monitor in communication with the receiver and the sensor thereby receiving the first monitoring signal and the sensor signal, the monitor configured to provide the second monitoring signal that includes the information contained in the first monitoring signal and the sensor signal.

8. The voltage distribution network monitoring system of claim 7, wherein the monitor is configured to provide the second monitoring signal by transmitting the second monitoring signal through the voltage carrying power line.

9. A voltage distribution network monitoring system for monitoring a voltage distribution network that includes at least one voltage carrying power line, at least a transformer, and a network protector for protecting the at least a transformer, the monitoring system comprising:

at least one transmitter located along the voltage carrying power line including at least one sensor that monitors a condition of the voltage distribution network and produces a sensor signal that contains information related to the condition being monitored, wherein the transmitter provides a first monitoring signal that includes the information related to the condition being monitored; and a transceiver module located proximate to the network protector for receiving the first monitoring signal and providing a second monitoring signal, the transceiver module comprising:
- a receiver located along the voltage carrying power line at a distance from the transmitter, the receiver configured to receive the first monitoring signal;
- a sensor that monitors a condition of the voltage distribution network and produces a sensor signal that contains information related to the condition being monitored; and
- a monitor in communication with the receiver and the sensor thereby receiving the first monitoring signal and the sensor signal, the monitor configured to provide the second monitoring signal that includes the information contained in the first monitoring signal and the sensor signal;
- wherein the monitor is configured to determine a condition based upon the information contained in at least one of the first monitoring signal and the sensor signal, and to control the network protector to selectively disconnect the at least a transformer from the voltage distribution network based upon the condition.

10. The voltage distribution network monitoring system of claim 7, wherein the monitor is further configured to determine whether the voltage carrying power line is available for transmission at a point in time by determining whether the receiver is receiving a first monitoring signal at the point in time.

11. The voltage distribution network monitoring system of claim 7, wherein the transmitter is a second transceiver module including:
- a receiver located along the voltage carrying power line; and
- a monitor in communication with the receiver and the sensor, the monitor providing the first monitoring signal.

12. The voltage distribution network of claim 7, wherein the monitor is in communication with an external network and wherein the monitor is configured to provide the second monitoring signal by transmitting the second monitoring signal through the external network.

13. The voltage distribution network of claim 7, wherein the voltage distribution network includes an external network and a computer system that is connected to the external network and provides a command signal through the external network, wherein the monitor is in communication with the external network and the monitor receives the command signal and performs an operation based upon the command signal.

14. The transceiver module of claim 5, wherein the monitor is configured to provide the second monitoring signal by transmitting the second monitoring signal through the voltage carrying power line.

15. The transceiver module of claim 5, wherein the monitor is further configured to determine whether the voltage carrying power line is available for transmission at a point in time by determining whether the receiver is receiving a first monitoring signal at the point in time.

16. The transceiver module of claim 5, wherein the voltage distribution network includes an external network, wherein the monitor is in communication with the external network and wherein the monitor is configured to provide the second monitoring signal by transmitting the second monitoring signal through the external network.

17. The transceiver module of claim 5, wherein the voltage distribution network includes an external network and a computer system that is connected to the external network and provides a command signal through the external network, wherein the monitor is in communication with the external network and wherein the monitor receives the command signal and performs an operation based upon the command signal.

18. The transceiver module of claim 5 wherein the receiver comprises a pick-up antenna located along the voltage carrying power line at a distance from the transmitter, the pick-up antenna configured to receive the first monitoring signal, and the pick-up antenna is not hard-wired to the voltage carrying power line.

19. The voltage distribution network monitoring system of claim 9 wherein the receiver comprises a pick-up antenna located along the voltage carrying power line at a distance from the transmitter, the pick-up antenna configured to receive the first monitoring signal, and the pick-up antenna is not hard-wired to the voltage carrying power line.

* * * * *